Dec. 23, 1930.   G. R. McDONALD   1,786,311
REGULATING SYSTEM
Filed Dec. 26, 1929
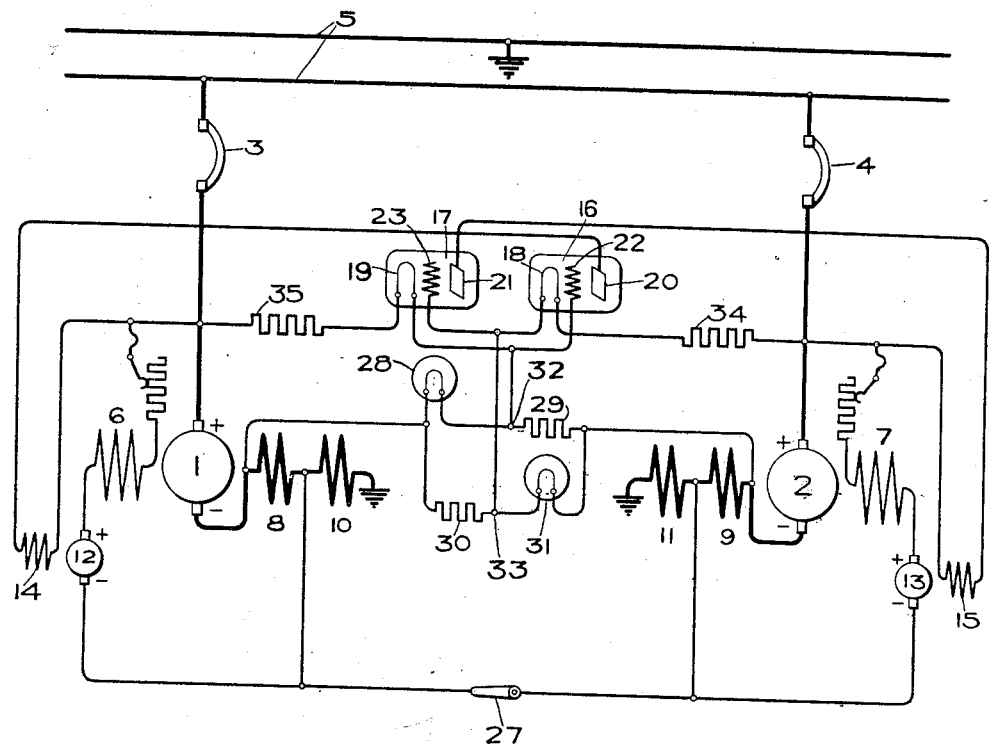
Inventor:
Gordon R. McDonald,
by Charles E. Tullar
His Attorney.

Patented Dec. 23, 1930

1,786,311

UNITED STATES PATENT OFFICE

GORDON R. McDONALD, OF ERIE, PENNSYLVANIA, ASSIGNOR TO GENERAL ELECTRIC COMPANY, A CORPORATION OF NEW YORK

REGULATING SYSTEM

Application filed December 26, 1929. Serial No. 416,343.

My invention relates to regulating systems and particularly to systems in which electron discharge devices are used for regulating the division of load between a plurality of parallel connected sources of current and its object is to provide an improved load regulating system of the above type.

My invention will be better understood from the following description when taken in connection with the accompanying drawing and its scope will be pointed out in the appended claims.

Referring to the drawing, the single figure of which is a diagram of connections of a load regulating system embodying my invention, 1 and 2 represent two sources of current shown as compound direct current generators which are respectively connected, by suitable circuit breakers 3 and 4, to a common load circuit 5. The generators 1 and 2 are respectively provided with shunt field windings 6 and 7, series commutating field windings 8 and 9 and series field windings 10 and 11.

The output of the generator 1 is controlled by regulating the excitation of a counter-electromotive force machine 12, the armature of which is connected in series with the shunt field winding 6 of the generator 1 and the field winding 14 of which is connected across the terminals of the generator 1. The output of the generator 2 is controlled in a similar manner by regulating the excitation of a counter-electromotive force machine 13 the armature winding of which is connected in series with the shunt field winding 7 of the generator 2 and the field winding 15 of which is connected across the terminals of the generator 2.

In order to maintain a predetermined division of load between the two generators 1 and 2, I control the excitations of the counter-electromotive force machines 12 and 13 by means of the electron discharge devices 16 and 17 respectively. As shown, the devices 16 and 17 are respectively provided with cathodes 18 and 19, anodes 20 and 21 and controlling electrodes 22 and 23. The plate circuits of the devices 16 and 17 are respectively connected in series with the field windings 14 and 15 of the counter-electromotive force machines 12 and 13.

In order that the excitation of the counter-electromotive force machine 12 may be controlled so that the voltage of the generator 1 is decreased when the generator is supplying more than its share of the total load and is increased when the generator 1 is supplying less than its share of the total load, the cathode 18 and the controlling electrode 22 of the device 16 are so connected that the controlling electrode 22 becomes more positive with respect to the cathode 18 when the generator 1 is supplying more than its share of the total load so that the current through the field winding 14 of the counter-electromotive force machine 12 is increased and the controlling electrode 22 becomes more negative with respect to the cathode 18 when the generator 1 is supplying less than its share of the total load so that the excitation of the field winding 14 of the counter-electromotive force machine 12 is decreased. In a similar manner, the cathode 19 and the controlling electrode 23 of the device 17 are so connected that the controlling electrode 23 becomes more positive with respect to the cathode 19 when the generator 2 is supplying more than its share of the total load so that the excitation of the field winding 15 of the counter-electromotive force machine 13 is increased and the controlling electrode 23 becomes more negative with respect to the cathode 19 when the generator 2 is supplying less than its share of the total load so that the excitation of the machine 13 is decreased.

In the particular embodiment of my invention shown in the drawing, these variations in the relative potentials of the electrodes of the devices 14 and 15 in response to the relative loads on the two generators 1 and 2 are obtained by connecting the positive terminals of the series commutating field windings 10 and 11 together by an equalizing switch 27 so that the voltage drop across each series commutating winding is proportional to the current output of the associated generator. The negative terminals of the two commutating windings 8 and 9 are connected together by two circuits, one of which includes the series connected resistors 28 and 29 and the other of which includes the series connected resistors 30 and 31. The resistors 28 and 31 which are respectively connected adjacent to the generators 1 and 2 are constructed of suitable material, examples of which are well known in the art, which has a relatively higher temperature coefficient than the material of which the resistors 29 and 30 are made so that a given change in current through the resistors produces a greater percent change in the voltage drop across the resistors 28 and 31 than across the resistors 29 and 30. Therefore, when a current flows from the negative terminal of the field winding 8 to the negative terminal of the field winding 9, the potential at a given point 32 intermediate the resistors 28 and 29 becomes more negative with respect to a given point 33 intermediate the resistors 30 and 31 as the current increases and less negative as the current decreases. In a similar manner when current flows from the negative terminal of the field winding 9 to the negative terminal of the field winding 10, the potential at the point 32 becomes more positive with respect to the point 33 as the current increases and less negative as the current decreases. In accordance with my invention, I employ this variation in the relative potentials of the points 32 and 33 as a means for controlling the currents through the electron discharge devices 16 and 17. This result is accomplished by connecting the cathode 18 of the device 16 and the controlling electrode 23 of the device 17 to the point 33 intermediate the resistors 30 and 31 and the cathode 19 of the device 17 and the controlling electrode 22 of the device 16 to the point 32 intermediate the resistors 28 and 29.

The cathodes 18 and 19 of the devices 16 and 17 may be heated in any suitable manner. As shown in the drawing, the cathode 18 is connected across the terminals of the generator 2 with the resistors 34 and 31 in series therewith and the cathode 19 is connected across the terminals of the generator 1 with the resistors 35 and 28 in series therewith.

The operation of the arrangement shown in the drawing is as follows: When each generator is supplying its proper share of a total load, the potential drops across the commutating field windings 8 and 9, which act as impedances in the circuit of the generators, are such that the potential difference between the negative terminals of the windings 8 and 9 causes currents of the proper magnitude and direction to flow through the resistors 28 and 29 and the resistors 30 and 31, to produce a potential difference between the points 32 and 33 which causes the devices 16 and 17 to pass the proper amounts of current to maintain the excitations of the generators 1 and 2 at the necessary value to produce the desired division of load between the generators.

If the load on the generator 1 increases with respect to the load on the generator 2, so that the generator 1 is supplying more than its share of the total load, the potential drop across the commutating field winding 8 increases relatively to the potential drop across the field winding 9. Consequently, the negative terminal of the winding 8 becomes more negative with respect to the negative terminal of the field winding 9 and, therefore, if the potential of the negative terminal of winding 8 is below the potential of the negative terminal of winding 9, an increased current flows from the negative terminal of the field winding 9 to the negative terminal of the field winding 8. This increased current produces a larger percent change in the potential drop across the resistors 28 and 31, than across the resistors 29 and 30 so that the point 32 intermediate the resistors 28 and 29 becomes more positive with respect to the point 33 intermediate the resistors 30 and 31. Therefore, the controlling electrode 22 of the device 16 becomes more positive with respect to its associated cathode 18 and consequently more current flows through the field winding 14 of the counter-electromotive force machine 12 associated with the generator 1. This increase in the current through the field winding 14 decreases the excitation of the generator 1 so as to decrease the current output thereof.

The increase in the potential of the point 32 relatively to the point 33 also causes the controlling electrode 23 of the device 17 to become more negative with respect to its associated electrode 19 so that the current through the field winding 15 of the counter-electromotive force machine 13 is decreased. This decrease in the excitation of the counter-electromotive force machine 13 results in an increase in the excitation of the generator 2 so that it increases its current output. Therefore, the excitations of both generators are simultaneously varied in a manner to restore the desired division of load between them.

If the load on the generator 2 increases with respect to the load on the generator 1, so that the generator 2 is supplying more than its share of the total load, the potential drop across the field winding 9 increases relatively to the potential drop across the field winding 8. Consequently the negative terminal of the field winding 8 becomes less negative with respect to the negative terminal of the field winding 9 and therefore the point 32 becomes less positive with respect to the point 33. This change in the relative potentials of the points 32 and 33 causes the device 16 to decrease the excitation of the field winding 14 of the counter-electromotive force machine 12 and causes the device 17 to increase the excitation of the field winding 15 of the counter-electromotive force machine 13. Therefore, the current output of the machine 2 is decreased and the current output of the machine 1 is increased to restore the desired load division between the two generators.

By using a combination of resistors having different temperature coefficient, it will be seen that I am able to obtain a sensitive operation of the electron discharge devices since a given change in potential difference between the negative terminals of the windings 8 and 9 produces a greater percent change in the relative potentials of the points 32 and 33.

While I have, in accordance with the patent statutes, shown and described my invention as applied to a particular system and as embodying various devices diagrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States is:

1. In combination, two sources of current connected in parallel, and means for maintaining a predetermined division of load between said sources including a plurality of resistors having different temperature coefficients connected to said sources so that a given percent change in the differences between the current outputs of said sources produces a greater percent change in the potential difference between predetermined points on said resistors, and regulating means responsive to the potential difference between said predetermined points.

2. In combination, two sources of current connected in parallel, and means for maintaining a predetermined division of load between said sources including impedance means respectively connected in series with each source, an equalizer connection between one end of said impedance means and the corresponding end of the other impedance means, a plurality of resistors having different temperature coefficients connected between the other ends of said impedance means in such a manner that a given percent change in the difference between the potential drops across said impedance means produces a greater percent change in the potential difference between predetermined points on said resistors, and means responsive to the potential drop between said predetermined points on said resistors for regulating the current output of one of said sources.

3. In combination, two sources of current connected in parallel, and means for maintaining a predetermined division of load between said sources including impedance means respectively connected in series with each source, an equalizer connection between one end of said impedance means and the corresponding end of the other impedance means, a plurality of resistors having different temperature coefficients connected between the other ends of said impedance means in such a manner that a given percent change in the difference between the potential drops across said impedance means produces a greater percent change in the potential difference between predetermined points on said resistors and means responsive to the potential drop between said predetermined points on said resistors for regulating the current outputs of said sources so that the output of the source supplying more than its share of the total load is decreased and the output of the other source is increased.

4. In combination, two sources of current connected in parallel, and means for maintaining a predetermined division of load between said sources including impedance means respectively connected in series with each source, an equalizer connection between one end of said impedance means and the corresponding end of the other impedance means, a plurality of resistors having different temperature coefficients connected between the other ends of said impedance means in such a manner that a given percent change in the difference between the potential drops across said impedance means produces a greater percent change in the potential difference between predetermined points on said resistors, and an electron discharge device having its cathode connected to one of said predetermined points on said resistors and its controlling electrode connected to the other of said predetermined points on said resistors.

5. In combination, two parallel connected generators, and means for maintaining a predetermined division of load between said generators including a field winding respectively connected in series with each generator, an equalizer connection between one end of one of said field windings and the corresponding end of the other field winding, two parallel circuits interconnecting the other ends of said windings, each of said parallel circuits including two series connected resistors which have different temperature coefficients and which are alternately arranged in the respective circuits, and means for controlling the excitation of one of said generators including an electron discharge device having its cathode connected to a point intermediate the series connected resistors in one of said parallel circuits and its controlling electrode connected to a point intermediate the series connected resistors in the other parallel circuit.

6. In combination, two parallel connected generators, and means for maintaining a predetermined division of load between said generators including a field winding respectively connected in series with each generator, an equalizer connection between one end of one of said field windings and the corresponding end of the other field winding, two parallel circuits interconnecting the other ends of said windings, each of said parallel circuits including two series connected resistors which have different temperature coefficients and which are alternately arranged in the two circuits, means for controlling the excitation of one of said generators including an electron discharge device having its cathode connected to a point intermediate the series connected resistors in one of said parallel circuits and its controlling electrode connected to a point intermediate the series connected resistors in the other parallel circuit, and means for controlling the excitation of the other generator including a second electron discharge device having its controlling electrode and cathode respectively connected to the same points as the cathode and controlling electrode of said first mentioned electron discharge device.

In witness whereof, I have hereunto set my hand this 21 day of December, 1929.

GORDON R. McDONALD.